US008844004B2

(12) United States Patent
Dickgiesser et al.

(10) Patent No.: US 8,844,004 B2
(45) Date of Patent: Sep. 23, 2014

(54) AUTOMATIC USER CREDENTIALS FOR REMOTE SUPPORT

(75) Inventors: Klaus Dickgiesser, Karlsruhe (DE); Gunter Hoffelder, Roedersheim-Gronau (DE); Wolfram Bonheim, Muehlhausen (DE); Thorsten Burkert, Rimbach/Odenwald (DE); Andreas Wolber, Heidelberg (DE)

(73) Assignee: SAP AG, Walldorf (DE)

( * ) Notice: Subject to any disclaimer, the term of this patent is extended or adjusted under 35 U.S.C. 154(b) by 483 days.

(21) Appl. No.: 12/916,181

(22) Filed: Oct. 29, 2010

(65) Prior Publication Data

US 2012/0110330 A1    May 3, 2012

(51) Int. Cl.
*H04L 29/06*   (2006.01)
*H04L 9/32*    (2006.01)

(52) U.S. Cl.
CPC .................................... *H04L 9/3271* (2013.01)
USPC ............... 726/5; 713/150; 713/168; 713/179; 713/182; 713/183

(58) Field of Classification Search
CPC ..................... H04L 41/0246; H04L 29/08099; H04L 9/3271
USPC .............................................................. 726/5
See application file for complete search history.

(56) References Cited

U.S. PATENT DOCUMENTS

| 6,601,171 | B1 * | 7/2003 | Carter et al. ................... 713/175 |
| 7,117,529 | B1 * | 10/2006 | O'Donnell et al. ............... 726/6 |
| 2001/0047406 | A1 * | 11/2001 | Araujo et al. .................. 709/223 |
| 2002/0194095 | A1 * | 12/2002 | Koren .............................. 705/35 |
| 2003/0065731 | A1 * | 4/2003 | Mohammed et al. ......... 709/208 |
| 2005/0074112 | A1 * | 4/2005 | Timmins .................. 379/218.01 |
| 2005/0108546 | A1 * | 5/2005 | Lehew et al. .................. 713/182 |
| 2005/0181765 | A1 * | 8/2005 | Mark ............................. 455/411 |
| 2005/0190769 | A1 * | 9/2005 | Smith ........................ 370/395.2 |
| 2006/0265598 | A1 * | 11/2006 | Plaquin et al. ................ 713/182 |
| 2007/0255943 | A1 * | 11/2007 | Kern et al. ..................... 713/155 |
| 2009/0052675 | A1 * | 2/2009 | Levow et al. .................. 380/278 |

OTHER PUBLICATIONS

Enomoto et al., A secure and easy remote access technology, Nov. 2005, Proceedings of the 6th Asia-Pacific Symposium on Information and Telecommunication Technologies, pp. 364-368.*

* cited by examiner

*Primary Examiner* — Thanhnga B Truong
*Assistant Examiner* — Kenneth Chang
(74) *Attorney, Agent, or Firm* — Schwegman Lundberg & Woessner, P.A.

(57) ABSTRACT

Various embodiments herein include at least one of systems, methods, and software to receive and process credential requests for remote support of computer applications. One embodiment includes receiving a credentials request in a first environment from a second environment in response to an incident in the first environment. This embodiment further includes processing the received credentials request within the first environment by approving the request, activating credentials, and sending the credentials to the second environment. This embodiment may further include receiving, within the first environment, a message indicating the incident is resolved and deactivating the credentials.

12 Claims, 7 Drawing Sheets

AUTOMATIC USER CREDENTIALS FOR REMOTE SUPPORT

BACKGROUND INFORMATION

Organizations that utilize software systems developed by others often encounter errors in their software systems. When the organization or users within the organization encounter an error, the organization or user may provide details of the error to a support resource. Note that support resource, as used herein, generally refers to a support organization, a particular support consultant of a support organization, or other individual or entity that may be involved in resolving an identified or detected incident or other issue. The support resource may then attempt to reproduce and to resolve the error. Should the support consultant of the support organization be unsuccessful in reproducing and resolving the error, the support resource will need to log into the software system of the organization to observe the error. However, the support resource will need user credentials to do so. To obtain the user credentials, the support resource must either request credentials and wait for the request to be fulfilled, have existing credentials already available, or utilize other mechanisms. However, the organization may have privacy concerns regarding the activities the support resource may engage in while accessing the software system, which can be more of a problem when the user credentials are already available. Additionally, the organization may not know who the support resource is that is requesting credentials and therefore may be reluctant to grant system access. These and many other problems exist in current user credentialing of support resources.

DETAILED DESCRIPTION

Organizations that utilize software systems developed by others often encounter errors in their software systems. When the organization or users within the organization encounter an error, the organization or user may provide details of the error to a support resource. The support resource may then attempt to reproduce and resolve the error. Should the support resource be unsuccessful in reproducing and resolving the error, the support resource will need to log into the software system of the organization to observer the error. However, the support resource will need user credentials to do so. To obtain the user credentials, the support resource must either request credentials and wait for the request to be fulfilled, have existing credentials already available, or utilize other mechanisms. However, the organization may have privacy concerns regarding the activities the support resource may engage in while accessing the software system, which can be more of a problem when the user credentials are already available. Additionally, the organization may not know who the support resource is that is requesting credentials and therefore may be reluctant to grant system access. These and many other problems exist in current user credentialing of support resources.

In business computing, off the shelf software that can be customized through configuration to meet the needs of particular customers has become common. The software may be deployed on customer computers at a customer controlled or designated site. Alternatively, the software may be deployed as a service available over a network by a developer of the software or by a third party. Regardless of how the software is deployed, the customer has not developed the software. Thus, should an error or other issue arise in the software and be detected by a user or by a monitoring process within the software, the customer or monitoring process detecting the error or other issue may need to report the error or other issue. Such errors and other issues that may be detected or otherwise identified by a user or monitoring process are referred to herein collectively as incidents. These incidents may be reported to support resources which may include a support resource which is a support organization of the software developer.

Upon receipt of an incident notice from a customer, the developer of the software will investigate the incident and attempt to resolve the incident based on existing knowledge, reproduce the issue on a non-customer instance of the software, or perform other activities. However, in some instances, an incident may not be reproduced or be analyzed by the developer and therefore, in the interest of fully investigating the incident, necessitate a support resource of the developer to login to the customer software instance.

To login to the customer software instance, the support resource typically needs login credentials. To obtain the login credentials, the support resource may submit a request to the customer software instance or associated credentialing processes, such as over a network. The request in some embodiments may be sent as a chat or other text based message. The request will include information provided by or otherwise obtained from the support resource and a computer application utilized to generate the request. Such information may include a user identifier of the support resource, an identifier of the incident report, and other information. The information included within the request submitted by the support resource is used by the customer software instance or associated credentialing process to generate or activate existing login credentials. The customer software instance or associated credentialing process, upon receipt of the request may automatically generate or activate the login credentials and send the login credentials to the support resource. Upon receipt of the login credentials, the support resource may login to the customer software system to reproduce and analyze the incident. In some embodiments, to help ensure security is maintained, communication between a computer application of the support resource and the customer software instance may be conducted via a virtual private network (VPN), utilizing symmetric or asymmetric encryption, or by other secure mechanisms via a computer network. These and other embodiments are further described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
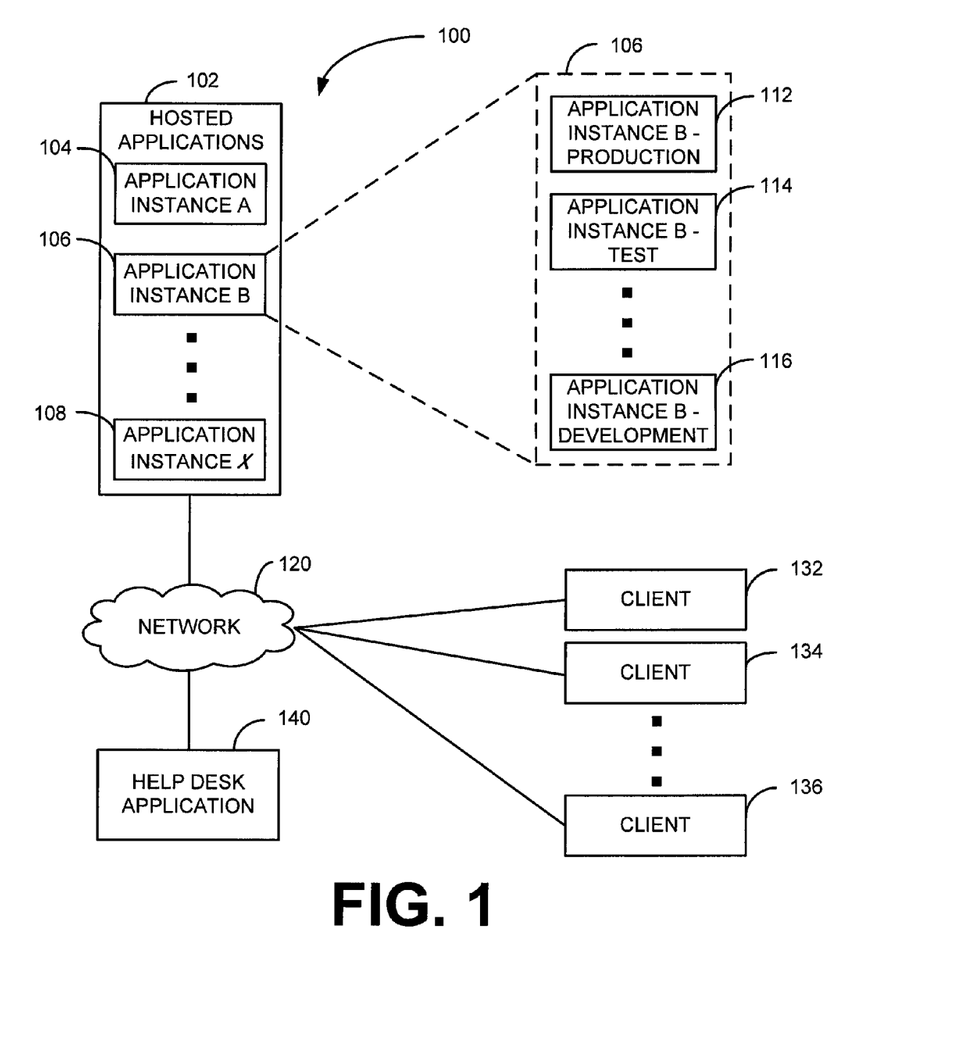
FIG. 1 is a block diagram of a system, according to an example embodiment.

FIG. 1 is a block diagram of a system 100, according to an example embodiment. The system 100 includes hosted applications 102. The hosted applications 102 comprise one or more application instances 104, 106, 108. In some embodiments, each application instance 104, 106, 108 may itself represent multiple instance of a hosted application, for example a production instance 112, a test instance 114, and a development instance 116 of application instance B 106.

The hosted applications 102 are application instances 104, 106, 108 hosted on one or more servers or server clusters to provide client computers 132, 134, 136 access to the application instances 104, 106, 108 via a network 120. The network 120 may be one or more of the Internet, a local area network, a wide area network, a wired network, a wireless network, and other network types, the connections of which may be established through various network interconnection devices and methods.

The system 100 may also include a help desk application 140. The help desk application 140 is an application that may be utilized to submit incident reports to a support resource for the hosted applications 102, an entity hosting the hosted applications 102, or other party that may assist in resolving a reported incident. In a typical embodiment, a client computer 132, 134, 136 is utilized by a user to access an application instance 104, 106, 108 via the network 120. An incident may be experienced by the user of the client computer 132, 134, 136 while accessing one of the hosted applications 104, 106, 108. The user may report the incident through the help desk application 140. The incident report may then be presented to a user of an organization to which the incident was reported. The incident report may be presented by the help desk application 140 over the network 120 to a client 132, 134, 136 of the appropriate user, such as a support resource.

In some embodiments, the user viewing a submitted incident report, such as a support resource, may have a need to access the application instance 104, 106, 108 where the reported incident occurred. The support resource may then submit a login credential request to the proper application instance 104, 106, 108 or other location, depending on the embodiment, where the request can be processed and the support resource will receive the requested credentials.

In some embodiments, the incident reporting functionality may be included in a hosted application 104, 106, 108. In such embodiments, the help desk application 140 may be a tool exclusively for use by support resources, such as network and application administrators, software developers, engineers, and the like of an organization that developed or hosts the hosted applications 102. Other arrangements of incident reporting and communication functionality may be distributed and included in various applications, modules, and other hardware and software elements of the system 100.

Figure 2:
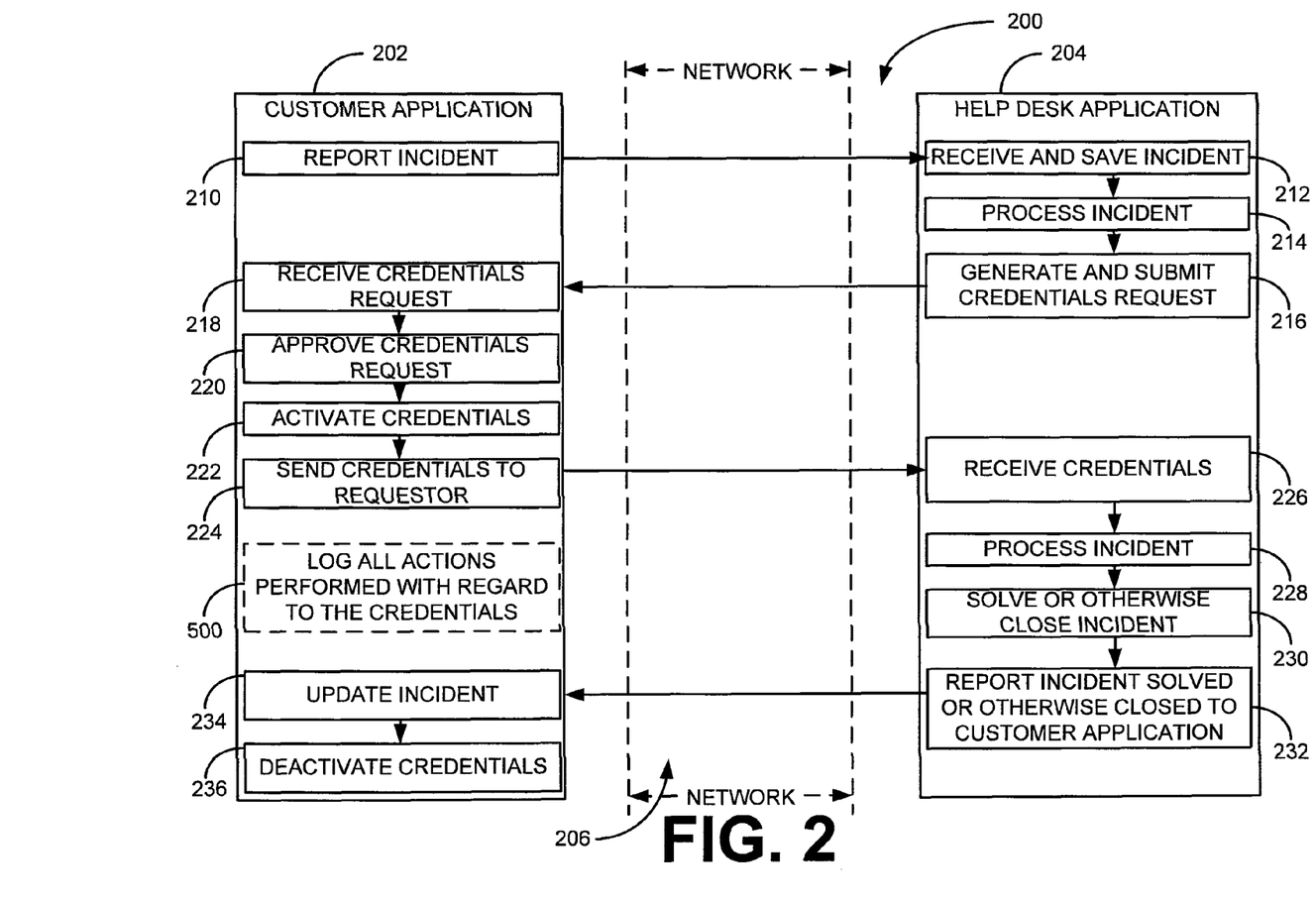
FIG. 2 is block flow diagram of a method illustrated with regard to system elements, according to an example embodiment.

FIG. 2 is block flow diagram of a method 200 illustrated with regard to system elements, according to an example embodiment. The system elements included in FIG. 2 are a customer application 202, a help desk application 204, and a network 206 that connects the customer application 202 and help desk application 204 for purposes of exchanging data and other communications.

The customer application 202 is an example of an application that executes on at least one computing device to provide client incident reporting and login credential request processing. In some embodiments, the functionality represented within the illustration and description of the customer application 202 may be divided between two or more applications or modules thereof. The help desk application 204 is an example of an application that executes on at least one computing device to provide help desk personnel with tools for viewing and servicing incident reports received from users, human and logical, of at least one customer application 202. In some embodiments, the functionality represented within the illustration and description of the help desk application 204 may be divided between two or more applications or modules thereof. The network 206 may be one or more of the Internet, a local area network, a wide area network, a wired network, a wireless network, and other network types, the connections of which may be established through various network interconnection devices and methods.

Communication between the customer application 202 and the help desk application 204 may be conducted over the network in one or more ways. In some embodiments, at least a portion of the communication is conducted via internet chat-based messaging. The internet chat-based messaging may be between processes of the customer application 202 and the help desk application 204, between a user and at least one of the customer application 202 and the help desk application 204, or between users of the customer application 202 and the help desk application 204. In further embodiments, the communication between the customer application 202 and the help desk application 204 may be in other forms, such as eXtensible Markup Language (XML) data exchanged over the network according the TCP/IP protocol, Simple Object Access Protocol (SOAP), or other suitable protocol. Further, data may be exchanged directly between the customer application 202 and the help desk application 204 or via a mailbox type arrangement where one or both of the customer application 202 and the help desk application 204 has an inbox that are check periodically by the other. In other embodiments, an inbox may be maintained for each of the customer application 202 and the help desk application 204 by a third party. Communication between the customer application 202 and the help desk application 204 may also be conducted using other methods, protocols, and mechanisms depending on the particular embodiment.

The method 200 begins in the customer application by the reporting 210 of an incident over the network 206 to the help desk application 204. The reporting 210 of the incident may be performed based on input received from a user. In other embodiments, the reporting 210 may be performed automatically by the customer application 202 upon occurrence of an error, fault, key performance indicator violation, or other incident.

Next, the help desk application 204 receives and saves 212 the incident, such as in a database. The help desk application then processes 214 reported 210 incident. In some embodiments, the processing 214 may include workflow routing of the request to initial support personnel that may attempt to resolve the reported incident through use of an existing knowledge base and diagnostic processes and resource. However, when the processing 214 fails to resolve the incident, the method 200 may forward the incident to another support resource with at least one of advanced knowledge, experience, help desk access credentials, and assigned responsibility for reproducing reported 210 incidents in customer applications. In such instances, the support resource or an automated process, in some embodiments, will generate and submit 216 a credentials request over the network 206 to the customer application 202.

In embodiments where the support resource generates and submits 216 the credentials request to the customer application 202, the remote resource may fill out a form presented on a display device of a computing device, such as a personal computer, tablet computer, smart phone, or other device. An example of such a form is illustrated and described below with regard to FIG. 3.

Figure 3:
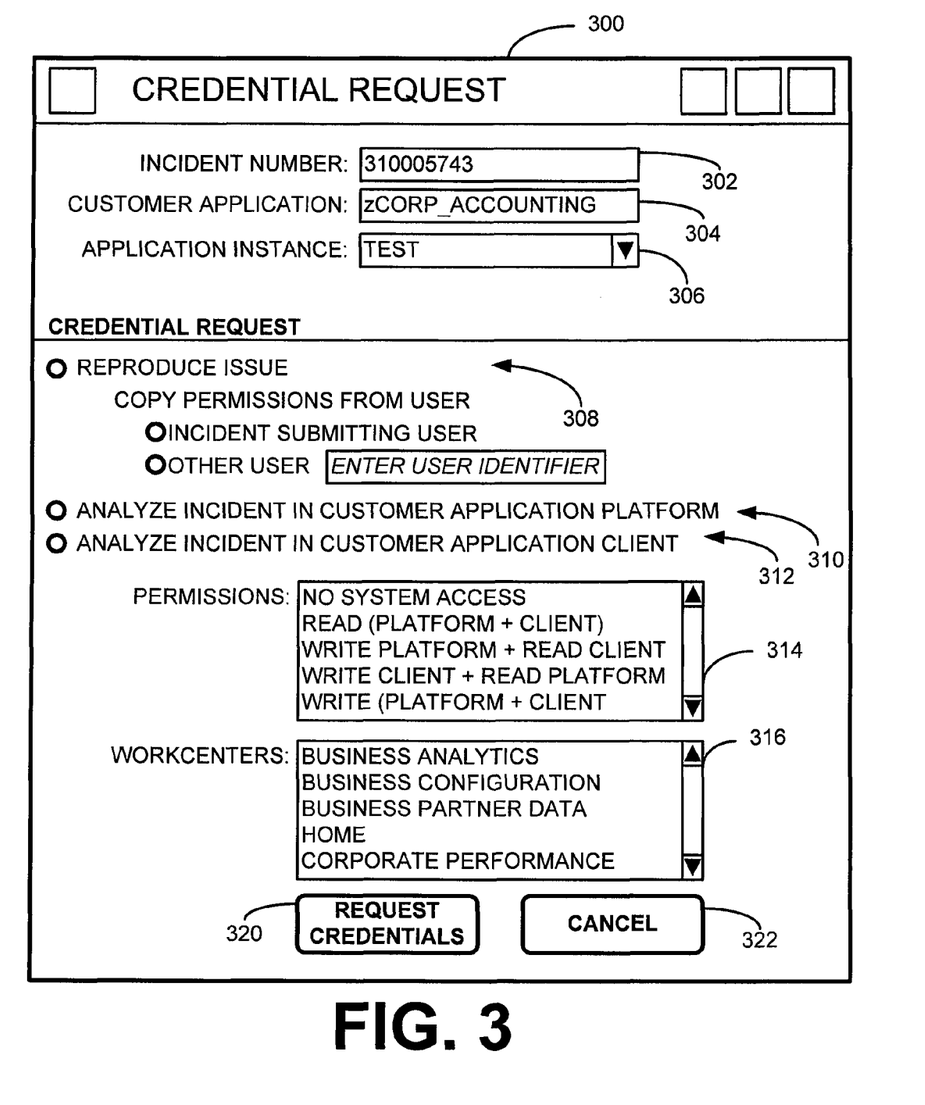
FIG. 3 is a user interface illustration according to an example embodiment.

After generation and submission 216 from the help desk application 204 over the network 206, the customer application 202 receives 218 the credentials request. The credentials request may then be processed in a number of ways depending on the particular embodiment. In some embodiments, the processing includes an automatic approval 220 of the credentials request when the request is received 218 from a known and authorized requestor or the requestor is a member of a known and authorized requesting entity or organization. In such embodiments that include automatic approval 220, there may be one or more approval rules that are applied to received 218 credential requests to determine if they should be automatically approved. One such rule according to some embodiments evaluates the credential request and customer application 202 permissions implicated by the request. Depending on the permission level needed, the request may be automatically approved or routed to one or more administrators to manually view prior to approval. Approval in some embodiments may be needed by more than one administrator. In other embodiments, the processing includes routing the received 218 credentials request to a customer application 202 administrator to review and approve 220 or reject the request. The credentials request, in some embodiments, may be presented to a customer application 202 administrator in a user interface, for example, in a user interface as illustrated and described with regard to FIG. 4. In some automatic approval 220 embodiments, when a received 218 credentials request is not automatically approved 220, the request may be forwarded to the customer application 202 administrator to review and approve 220 or reject.

When a received 218 credential request is approved 220, credentials in response to the request are activated 222. The activation 222 in some embodiments is performed automatically by the customer application 202. Activation 222 of credentials in some embodiments includes generating credentials, such as in a user database of the customer application 202, with a permission level adequate to allow a user of the credentials to reproduce the reported 210 incident. In other embodiments, activating 222 credentials includes selecting one of one or more credentials that already exist within the customer application 202 and setting the selected credentials to an active status.

Selecting existing credentials to activate may include selecting credentials having adequate or specific customer application 202 permissions suitable for reproducing the reported 210 incident. For example, customer application 202 permissions may permit access to different portions of the customer application 202 while preventing access to other portions. Further, even within portions of the customer application to which permissions are granted, the permissions may limit actions (i.e., create, read, update, delete actions with regard to data) that may be performed within the permitted portions. In some embodiments, credentials activated 222 with regard to a reported 210 incident will be activated in a manner such that all activity within the customer application 202 utilizing the activated 222 credentials will be logged. Further, the credentials may be activated within a particular application instance, such as a development, test, production, or other application instance.

Once the credentials are activated 222, the method 200 includes sending 224 the credentials to the requestor. Sending 224 the credentials to the requestor may include encrypting all or a portion of the credentials prior to the sending. The encryption may be performed according to a synchronous or asynchronous encryption key. The sending 224 of the credentials may be via email, text message, interne chat message, data messaging between the customer application 202 and the help desk application 204, XML formatted SOAP messages, or other communication mechanisms.

The credentials, after being sent 224, are received 226 at the help desk application 204. If the credentials are encrypted, the credentials will be decrypted and provided to the requesting or otherwise appropriate support resource. The support resource may then utilize the credentials to process 228 the incident. Processing 228 of the reported 210 incident typically includes logging into the customer application 202 over the network 206 and reproducing the reported 210 incident. The support resource may then determine how to best resolve the incident 230 and provide input indicating as such to the help desk application 204. The help desk application 204 may then report 232 the incident as resolved to the customer application 202.

The customer application 202, upon receipt of data from the help desk application 204 reporting 232 the incident is resolved, will then update 234 the incident. In some embodiments, the credentials that were activated 222 for the support resource will then be deactivated 236 preventing further access to the customer application. Deactivation 236 of the credentials, in some embodiments, is performed automatically within the customer application 202 upon receipt of the incident update 234.

In some instances, a particular support resource assigned to analyze and resolve an incident may not be able to handle the incident due to a lack of experience, vacation, or many other potential reasons. In such instances, the help desk application 204 may provide functionality to allow the particular support resource to send the incident to another support resource. In such embodiments, the help desk application 204 may determine if the particular support resource has requested or obtained credentials for accessing the customer application 202. When the particular resource has requested or already obtained credentials, the help desk application 204 sends a message to the customer application 202 to deactivate the credentials. The another support resource to whom the incident is transferred may then cause portions of the method 200 to be reexecuted, such as by starting at the generation and submission 216 of the credentials request. By deactivating credentials in such instances, the use of the credentials can be associated directly with the support resource that is utilizing the credentials. This enhances accountability and security within the customer application.

FIG. 3 is a user interface 300 illustration according to an example embodiment. The user interface 300 includes a form to be filled out to request credentials for accessing a customer application 202 as illustrated and described above with regard to FIG. 2. The form may be filled out and submitted 216 to the customer application to request the credentials.

In embodiments where the support resource generates and submits 216 the credentials request to the customer application 202, the remote resource may fill out a form presented on a display device of a computing device, such as a personal computer, tablet computer, smart phone, or other device. An example of such a form is illustrated and described below with regard to FIG. 3.

The user interface 300, as mentioned above, includes a form. The form includes fields that request data from a user requesting credentials for accessing a remote system, such as a customer application instance. Although several fields are illustrated within the form of the user interface 300, other forms may include more fields or fewer fields. Further, some or all of the fields may be automatically populated with data by a help desk application 204, as illustrated and described above with regard to FIG. 2. For example, an incident number 302 may be automatically populated within a help desk application or other application from which the user interface 300 is viewed. The customer application 304 and application instance 306 fields may also be automatically populated. By automatically populating the fields with data and limiting the abilities of support resources and other users to enter data into the fields, credential requests may only be submitted with regard to an incident reported to the help desk application. This helps ensure that security standards are maintained with regard to credential requests. In some instances though, and some other embodiments, a user may input data into the incident number 302, customer application 304, and application instance 306 fields. Regardless of how data is input into the Incident number 302, customer application 304, and application instance 306 fields, the data in these fields identifies an incident, a customer application, and an application instance of the customer, if there is more than one, for which credentials will be requested.

The details of the credential request are provided in the lower portion of the user interface 300. The details of the credential request are obtained by requesting input identifying the purpose of the request and other data depending on that purpose. In the example embodiment illustrated in FIG. 3, the details of the credential request include the purposes of "Reproducing Issue" 308, "Analyze Incident in Customer Application Platform" 310, and "Analyze Incident in Customer Applicant Client" 312. For some of these purposes, a requesting user need to submit additional information. For example, when the purpose of the credential request is to Reproduce Issue 308, input identifying a customer application user to copy credential permissions from is requested. This allows the credentials provided to the user submitting the credential to have suitable credentials that match the customer application user that encountered the incident. That user may be identified by the user that submitted the incident or by specifying another customer application user.

In these and other embodiments, the form of the user interface 300 may allow a requesting user to specify customer application permissions to request through a user interface control 314. The user interface 300 may also include another user interface control 316 to allow the requesting user to specify portions of the customer application for which permissions are requested.

At anytime while viewing the user interface 300, a user may select the Cancel action button 322 to close the user interface without submitting a credential request. Upon completion of the user interface 300 form, a user may select the Request Credentials action button 320. The Request Credentials action button 320 will format the data in the form of the user interface 300 for transport and submit the formatted data as a credentials request to a customer application 202 or other application, process, or service designated for handling and processing such requests for the customer application identified in the data.

Figure 4:
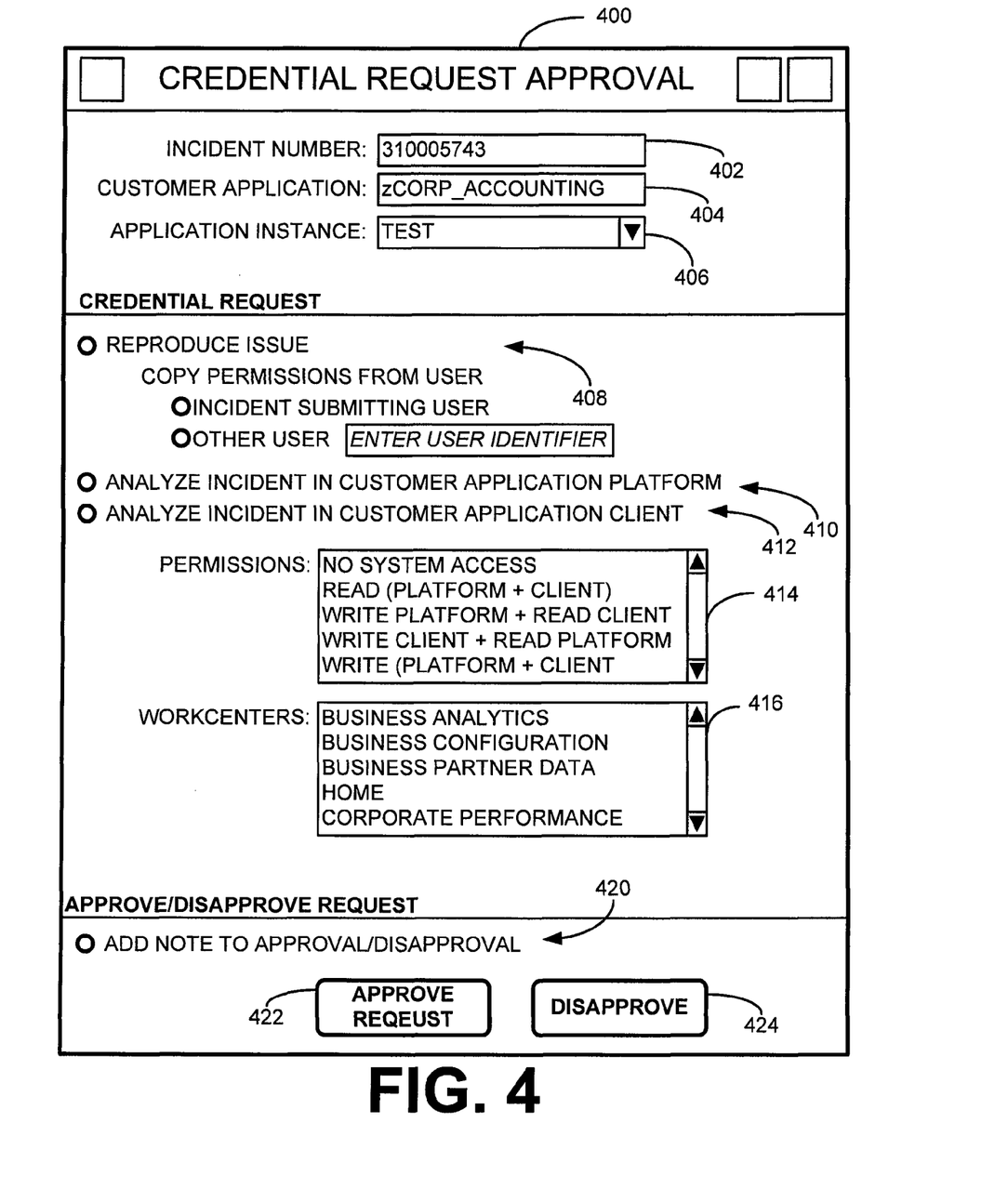
FIG. 4 is a user interface illustration according to an example embodiment.

FIG. 4 is a user interface illustration 400 according to an example embodiment. The user interface 400 includes a form populated with data from a credentials request for a support resource to access a customer application 202 such as is illustrated and described above with regard to FIG. 2. For example, data of a request presented in the form within the user interface 400 may be data provided as input into the form of the user interface 300 illustrated and described above with regard to FIG. 3.

The user interface 400 of FIG. 4 provides form mirroring the form of the user interface 300 of FIG. 3. The data input into the form of the user interface 300 is presented in the form of the user interface 400. The form of the user interface 400 need not include all of the fields, for example, the incident number 402, customer application 404, and application instance 406, in some embodiments may not be presented while the other fields and controls 408, 410, 412, 414, and 416 may be presented. The form of the user interface 400 also includes action buttons to Approve Request 422 and Disapprove 424 the request. Selection of the Approve Request 422 action button will trigger activation of credential as discussed with regard to the method 200 of FIG. 2. Selection of the Disapprove 424 action button will cause the credential request to be denied and closed in both the customer application 202 and a message being sent to the help desk application 204.

In some embodiments, the form presented in the user interface 400 may also include a user interface control 420 that allows a user to add a note to a credential request approval or disapproval action. Selection of the user interface control 420 may cause a note entering user interface control to open or display immediately or upon subsequent selection of one of the approve request 422 or Disapprove 424 request action buttons. In other embodiments, the user interface control 420 may instead present a note entering control directly within the form of the user interface 400.

In the user interfaces 300 and 400 of FIG. 3 and FIG. 4, respectively, common form fields are illustrated. Although the fields of these illustrated forms may be common fields in such forms, other embodiments include fewer, additional, and different fields. Additionally, the forms between the user interfaces 300 and 400 need not be so similar. The forms may instead be quite different from one another. Additionally, the data of the forms may instead be presented in a user interface that simultaneously displays data of multiple credential requests. Such a user interface may allow a customer application administrator to simultaneously approve or disapprove the multiple credential request, or a selected subset thereof.

Figure 5:
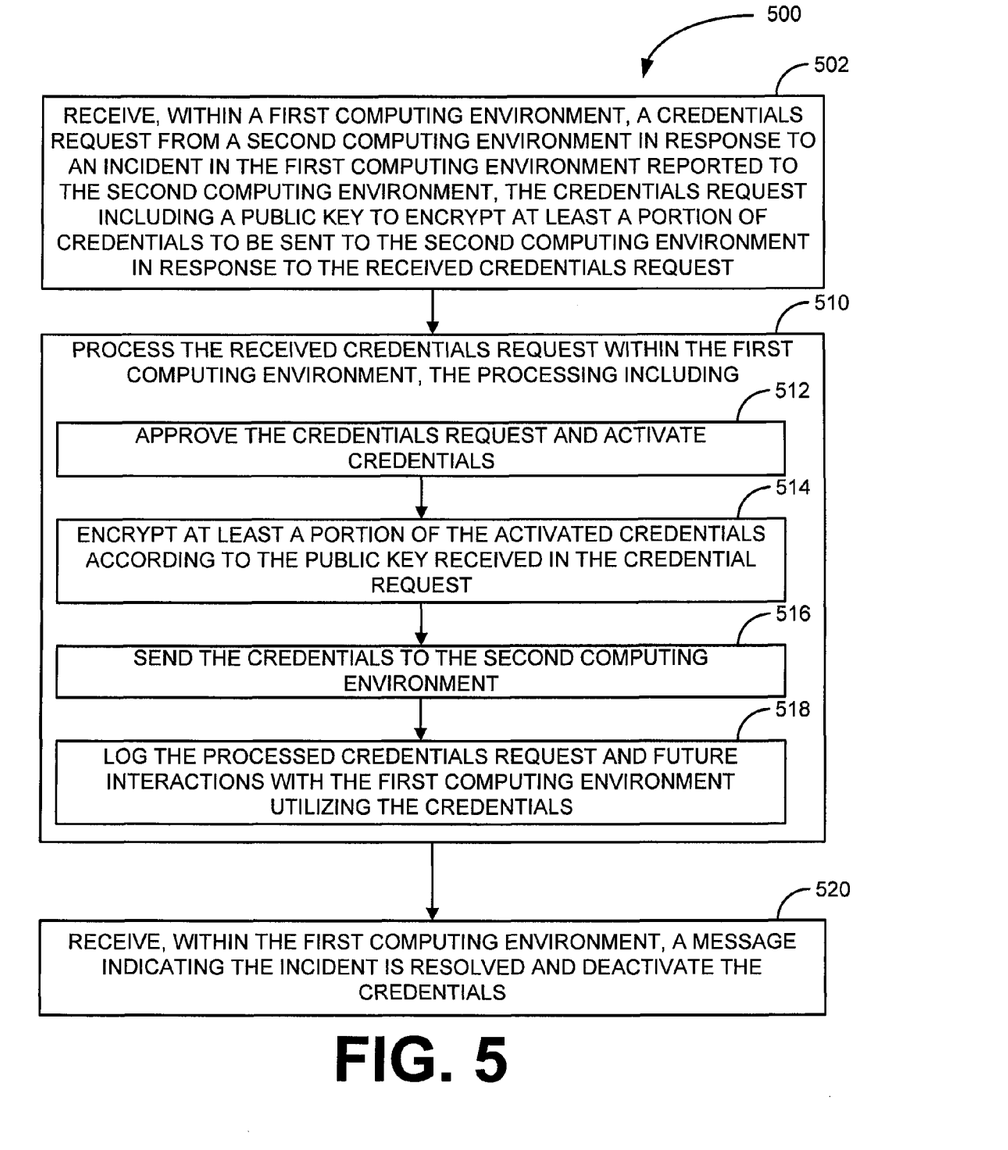
FIG. 5 is a block flow diagram of a method according to an example embodiment.

FIG. 5 is a block flow diagram of a method 500 according to an example embodiment. The method 500 is an example of a method of receiving and processing of a credential request between two computing environments. The example method 500 includes receiving 502, within a first computing environment, a credentials request from a second computing environment. The credentials request is typically received 502 within the first computing environment in response to an incident in the first computing environment reported to the second computing environment. The first computing environment in some embodiments is a computer environment that hosts an application, such as a customer enterprise resource planning application or other application. The second computing environment in some embodiments is a computing environment including help desk application. The received 502 credentials request may include a public key to encrypt at least a portion of credentials to be sent to the second computing environment in response to the received 502 credentials request.

The method 500 further includes processing 510 the received credentials request within the first computing environment. The processing 510 typically includes approving 512 the credentials request and activating credentials. In embodiments where the credentials request specifies an application instance within the first computing environment, some embodiments include approving 512 and activating the credentials includes activating the credentials within the application instance specified in the credentials request.

In some other embodiments of the method 500, approving and activating 512 the credentials includes identifying a pre-existing administrative user identifier having no permissions providing the administrative user identifier access to the first computing environment and then modifying those permissions to provide the administrative user identifier access to the first computing environment. In such embodiments, modifying the permissions may include modifying the permissions to permit access only to a portion of the first computing environment identified in the credentials request.

The processing 510 of the received credentials request may further include encrypting 514 at least a portion of the activated credentials according to the public key received in the credential request and sending 516 the credentials to the second computing environment. The encrypting may be performed according to various encryption algorithms, such as the RSA, AES, or other encryption algorithms. In some embodiments, the processing also includes logging 518 the processed credentials request and future interactions with the first computing environment utilizing the credentials. Subsequent to sending 516 the credentials to the second computing environment, the method 500 includes receiving 520, within the first computing environment, a message indicating the incident is resolved. The method 500 then includes deactivating the credentials. In other embodiments, the credentials are deactivated after a designated period, such as a number of hours, days, weeks, or other period. In these and some other embodiments, credentials are deactivated upon a support resource transferring an incident to another support resource or the assigned support resource simply indicating they are unable to resolve the incident. In some embodiments, the method 500 is performed in an asynchronous manner thereby allowing time to pass between performance of portions of the method 500 and portions of the processing 510.

In some embodiments of the method 500, the received 502 credentials request includes an identifier of a user within the second computing environment that submitted the credentials request. In another embodiment of the method 500, receiving 500 the credentials request from the second computing environment includes receiving a user identifier of a first computing environment user that submitted the incident to the second computing environment. In such embodiments, approving 512 and activating the credentials includes copying permissions associated with the user identifier of the first computing environment user and applying the copied permissions to the activated credentials.

In some embodiments of the method, the public key is a public key (e.g., an X.509 certificate) of a public/private key pair of an administrative user within the second computing environment from which the credentials request is received. Further sending 516 the credentials to the second computing environment may include sending the credentials in an email from the first computing environment to the administrative user. In other embodiments, the encrypted credentials may be sent in an XML container that is received and stored in the second computing environment without revealing the credentials to any users. The credentials in such embodiments may be stored in secure database tables, objects, or other data storage containers. The secure database tables, objects, or other data storage containers may store the credentials in an encrypted form. Regardless of the particular secure data storage container in such embodiments, the particular administrative user that is to utilize the credentials may select, within the second computing environment, a user interface element to access the first computing environment without having to manually provide user credentials. The credentials will then be retrieved by a process within the second computing environment, be decrypted, and provided to the first computing environment to log the particular administrative user into the first computing environment to analyze and resolve the incident. Additionally, various encryption algorithms and methodologies of implementing the various encryption algorithms may be utilized in various embodiments contemplated herein.

Figure 6:
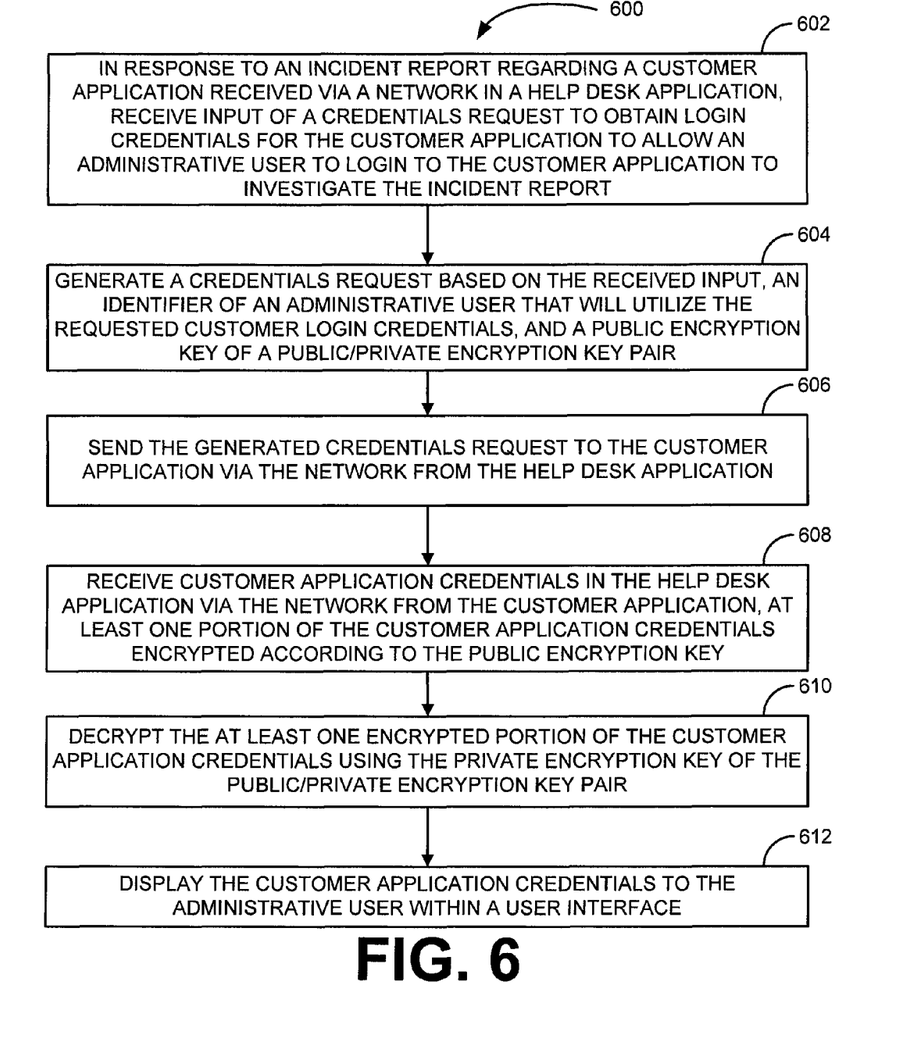
FIG. 6 is a block flow diagram of a method according to an example embodiment.

FIG. 6 is a block flow diagram of a method 600 according to an example embodiment. The method 600 is an example method of receiving an incident report in an incident reporting application with regard to a computer application. The method 600 includes receiving an incident report regarding a computer application, such as a customer application, via a network in a help desk application. The incident report may identify a portion of the customer application within which an incident of the incident report occurred. As used herein, a help desk application may be a specific application utilized to record and help service incidents with regard to one or more computer applications and computing infrastructure, such as networks, computing devices, printers, and other computing related resources. A help desk application, in some embodiments may refer to another application that is capable of receiving communication from another computer and perform at least a portion of the example method 600 or other methods and processes as illustrated and described herein.

The method 600 further includes, in response to a received incident report, receiving 602 input of a credentials request to obtain login credentials for the customer application to allow an support resource to login to the customer application to investigate the incident report. The method 600 may also generate 604 a credentials request based on the received input, an identifier of a support resource that will utilize the requested customer login credentials, and a public encryption key of a public/private encryption key pair which is then sent 606 to the customer application.

In some embodiments, the method 600 subsequently includes receiving 608 customer application credentials in the help desk application via the network from the customer application. At least one portion of the customer application credentials may be encrypted according to the public encryption key. When the customer application credentials are at least partially encrypted, the method 600 includes decrypting 610 the encrypted portion of the customer application credentials using the private encryption key of the public/private encryption key pair. The customer application credentials may then be displayed 612 to the support resource within a user interface. However, in other embodiments, the user credentials may instead be stored in secure database tables or other secure data containers as discussed above with regard to FIG. 5. When the customer application credentials are viewed, the viewing may be logged. In some such embodiments, the customer application credentials may not be viewed, but access to the customer application utilizing the credentials may be invoked by a support resource through selection of a user interface control.

Figure 7:
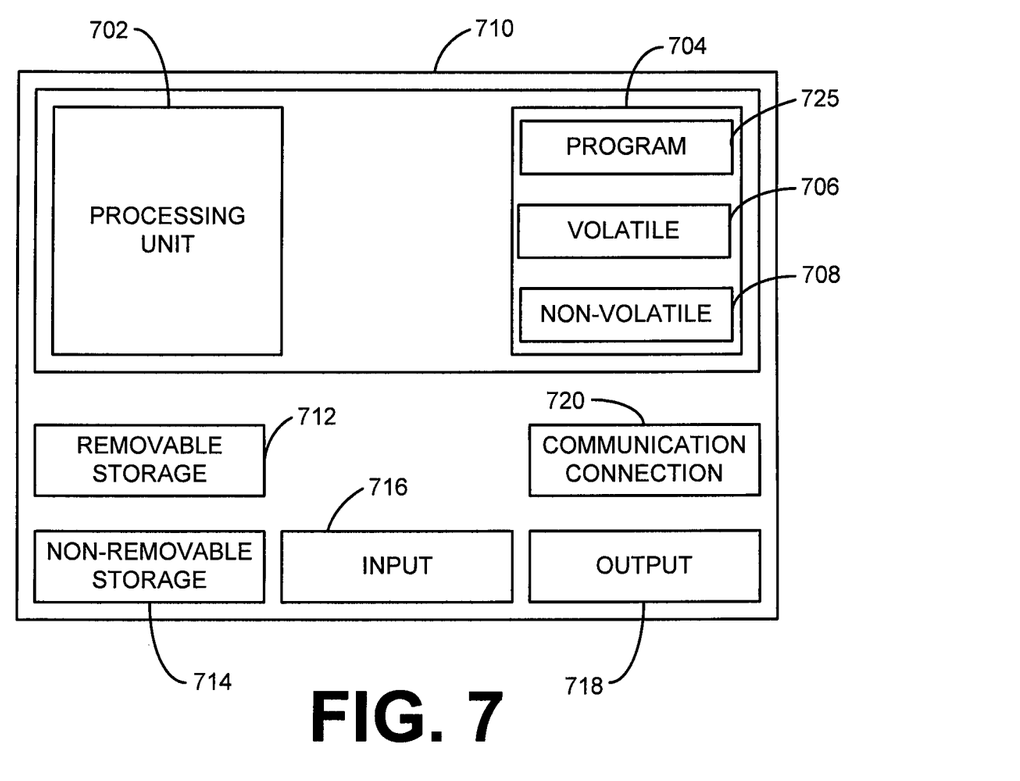
FIG. 7 is a block diagram of a computing device according to an example embodiment.

FIG. 7 is a block diagram of a computing device according to an example embodiment. In one embodiment, multiple such computer systems are utilized in a distributed network to implement multiple components in a transaction-based environment. An object oriented, service-oriented, or other architecture may be used to implement such functions and communicate between the multiple systems and components. One example computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium. For example, a computer program 725 capable of execution to perform at least a portion of one of the methods illustrated and described herein may be stored on a CD-ROM and loaded from the CD-ROM to a hard drive. The computer-readable instructions enable computer 710 to perform at least a portion of the methods, processes, and other portions of the subject matter illustrated and described herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving, within a first computing environment, a credentials request from a second computing environment, the credentials request including a public key to encrypt at least a portion of credentials to be sent to the second computing environment in response to the received credentials request, and further including a user identifier of a first computing environment user that submitted an incident to the second computing environment that is to be investigated with the requested credentials;
processing the received credentials request within the first computing environment, the processing performed automatically upon receipt of the credentials request, the processing including:
automatically approving the credentials request and activating credentials without receiving any first computing environment user input, wherein the activating of the credentials includes copying permissions associated with the user identifier of the first computing environment user and applying the copied permissions to the activated credentials;
encrypting at least a portion of the activated credentials according to the public key received in the credential request;
sending the credentials to the second computing environment for accessing at least a portion of the first computing environment by logging in with the credentials; and
logging the processed credentials request and future interactions with the first computing environment utilizing the credentials; and
deactivating the credentials to prevent further access to the first computing environment by the second computing environment with the credentials.

2. The method of claim 1, wherein the credentials request includes an identifier of a user within the second computing environment that submitted the credentials request.

3. The method of claim 1, wherein approving the credentials request includes:
presenting, in a user interface, a view of data representative of the credentials request including an option to approve the credentials request and an option to disapprove the credentials request;
receiving selection input into the user interface selecting the option to approve the credential request.

4. The method of claim 1, wherein the method is performed in an asynchronous manner thereby allowing for time to pass between performance of portions of the method and portions of the processing.

5. The method of claim 1, wherein:
the public key is a public key of a public/private key pair of an administrative user within the second computing environment from which the credentials request is received.

6. The method of claim 1, wherein:
the credentials request specifies an application instance within the first computing environment; and
activating the credentials includes activating the credentials within the application instance specified in the credentials request.

7. The method of claim 1, wherein activating the credentials includes:
identifying a preexisting user identifier having no permissions providing the user identifier access to the first computing environment; and
modifying the permissions to provide the user identifier access to the first computing environment.

8. The method of claim 7, wherein modifying the permissions to provide the user identifier access to the first computing environment includes modifying the permissions of the user identifier to permit access only to a portion of the first computing environment identified in the credentials request.

9. A system comprising:
at least one processor;
at least one memory device;
at least one network interface device;
instructions held in the at least one memory device and executable by the at least one processor to:
receive, via the at least one network interface device, a network accessible application credentials request from a help desk application in response to an incident within a network accessible application reported to the help desk application, the credentials request including a public key to encrypt at least a portion of credentials to be sent to the help desk application in response to the received credentials request, and receiving a user identifier of a network accessible application user that submitted the incident to the help desk application;
process, automatically upon receipt, the received credentials request by:
automatically approving the credentials request and activating credentials that permit access to the network accessible application without receiving any first computing environment user input, wherein the activating of the credentials includes copying permissions associated with the user identifier of the network accessible application user and applying the copied permissions to the activated credentials;
encrypting at least a portion of the activated credentials according to the public key received in the credential request;
sending the credentials to the help desk application; and
logging the processed credentials request and future interactions with the network accessible application utilizing the credentials; and
deactivating the credentials to prevent further access to the network accessible application by the help desk application with the credentials.

10. The system of claim 9, wherein:
the network accessible application credentials request includes an identifier of an administrative user that submitted the network accessible application credentials request; and
all activity within the network accessible application utilizing the credentials is logged with reference to the identifier of the administrative user that submitted the network accessible application credentials request.

11. The system of claim 9, wherein approving the credentials request includes:
presenting, in a user interface via a display device of the system, a view of data representative of the credentials request including an option to approve the credentials request;
receiving selection input into the user interface selecting the option to approve the credential request.

12. The system of claim 9, wherein the processing is performed in an asynchronous manner thereby allowing for time to pass between performance of portions of the processing.

* * * * *